(12) United States Patent
Zhou et al.

(10) Patent No.: US 12,174,074 B2
(45) Date of Patent: Dec. 24, 2024

(54) MICROSCALE IN-SITU IMAGING OF DYNAMIC TEMPERATURE AND DEFORMATION FIELDS

(71) Applicant: Georgia Tech Research Corporation, Atlanta, GA (US)

(72) Inventors: Min Zhou, Atlanta, GA (US); Amirreza Keyhani, Atlanta, GA (US); Rong Yang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 681 days.

(21) Appl. No.: 17/424,845

(22) PCT Filed: Jan. 21, 2020

(86) PCT No.: PCT/US2020/014335
§ 371 (c)(1),
(2) Date: Jul. 21, 2021

(87) PCT Pub. No.: WO2020/154245
PCT Pub. Date: Jul. 30, 2020

(65) Prior Publication Data
US 2022/0187133 A1 Jun. 16, 2022

Related U.S. Application Data

(60) Provisional application No. 62/795,339, filed on Jan. 22, 2019.

(51) Int. Cl.
*G01J 5/08* (2022.01)
*G01J 5/04* (2006.01)
(Continued)

(52) U.S. Cl.
CPC ............. *G01J 5/0859* (2013.01); *G01J 5/04* (2013.01); *G01J 5/0875* (2013.01); *G01J 5/80* (2022.01);
(Continued)

(58) Field of Classification Search
CPC .... G01J 5/0859; G01J 5/80; G01J 5/04; G01J 5/0875; G01J 5/485; G01J 2005/0077;
(Continued)

(56) References Cited

U.S. PATENT DOCUMENTS 4,533,221 A 8/1985 Trachtman
5,762,419 A * 6/1998 Yam .................... G01J 5/52
374/2

(Continued)

FOREIGN PATENT DOCUMENTS

WO 1997046004 A1 12/1997

OTHER PUBLICATIONS

International Search Report and Written Opinion dated Apr. 1, 2020 issued in PCT International Application No. PCT/US2020/014335.

*Primary Examiner* — Randy W Gibson
(74) *Attorney, Agent, or Firm* — Troutman Pepper Hamilton Sanders LLP; Ryan A. Schneider; Matthew J. Esserman

(57) ABSTRACT

An embodiment provides a system for measuring temperature and deformation fields of at least a portion of a sample, comprising a visible light camera, an infrared camera, and a beam splitter. The visible light camera is at a first location with respect to the sample and can take a visible light image of at least a portion of the sample at a first time. The infrared camera is at a second location with respect to the sample and can take an infrared image of the at least a portion of the sample at the first time. The beam splitter can receive a beam of light, comprising infrared and visible light, traveling in a (Continued)

direction normal to the at least a portion of the sample and direct the infrared light to the infrared camera and the visible light to the visible light camera.

34 Claims, 9 Drawing Sheets

(51) Int. Cl.

| | | |
|---|---|---|
| *G01J 5/0875* | (2022.01) | |
| *G01J 5/80* | (2022.01) | |
| *G02B 27/14* | (2006.01) | |
| *G06T 7/80* | (2017.01) | |
| *H04N 5/04* | (2006.01) | |
| *H04N 17/00* | (2006.01) | |
| *H04N 23/56* | (2023.01) | |
| *G01J 5/00* | (2022.01) | |
| *G01J 5/48* | (2022.01) | |

(52) U.S. Cl.
CPC ............ *G02B 27/141* (2013.01); *G06T 7/80* (2017.01); *H04N 5/04* (2013.01); *H04N 17/002* (2013.01); *H04N 23/56* (2023.01); *G01J 2005/0077* (2013.01); *G01J 5/485* (2022.01); *G06T 2207/10048* (2013.01)

(58) Field of Classification Search
CPC . G06T 7/80; H04N 23/56; H04N 5/04; H04N 17/002; G02B 27/141
See application file for complete search history.

(56) References Cited

U.S. PATENT DOCUMENTS

| | | |
|---|---|---|
| 6,355,420 B1 | 3/2002 | Chan |
| 2006/0245070 A1 | 11/2006 | Couture et al. |
| 2006/0289772 A1 | 12/2006 | Johnson |
| 2007/0009395 A1 | 1/2007 | Jiang |
| 2008/0099678 A1* | 5/2008 | Johnson ............ G01J 5/0859 250/332 |
| 2009/0105588 A1 | 4/2009 | Emelianov et al. |
| 2012/0186003 A1 | 7/2012 | Heger et al. |
| 2013/0188034 A1 | 7/2013 | Juette et al. |
| 2014/0063461 A1 | 3/2014 | Yao et al. |
| 2015/0138533 A1 | 5/2015 | Bolles et al. |
| 2015/0179401 A1 | 6/2015 | Zurich |
| 2015/0269742 A1 | 9/2015 | Bergstrom et al. |
| 2016/0003721 A1 | 1/2016 | Seok et al. |
| 2016/0252715 A1 | 9/2016 | Nakano et al. |
| 2016/0299062 A1 | 10/2016 | Marbach |
| 2017/0059407 A1 | 3/2017 | Shiraiwa |
| 2017/0086667 A1 | 3/2017 | Zhou et al. |
| 2017/0089689 A1 | 3/2017 | Boyle et al. |

* cited by examiner

MICROSCALE IN-SITU IMAGING OF DYNAMIC TEMPERATURE AND DEFORMATION FIELDS

CROSS-REFERENCE TO RELATED APPLICATIONS

This application claims priority, and benefit under 35 U.S.C. § 119(e), to U.S. Provisional Patent Application No. 62/795,339 filed 22 Jan. 2019. The disclosure of the prior application is hereby incorporated by reference as if fully set forth below.

STATEMENT REGARDING GOVERNMENT SUPPORT

This invention was made with government support under Grant No. FA9550-15-1-0499 awarded by the Air Force Office of Scientific Research. The government has certain rights in the invention.

FIELD OF DISCLOSURE

The disclosed technology relates generally to optical imaging, and more particularly to, systems and methods for simultaneously recording visible light images and infrared images of a same area of a sample to determine dynamic temperature and deformation fields.

BACKGROUND

The thermo-mechanical response of heterogeneous materials under static and dynamic loading can be of great importance in many applications. Static and dynamic loading events can cause severe damage and energy dissipation, leading to the formation of temperature spikes in a wide range of materials, including metals, polymers, composites, ceramics, shape memory alloys, biological tissue, and energetic materials. One class of temperature spikes is referred to as "hotspots." Hotspots can cause thermal softening, thermal runaway, or even the onset of chemical reactions in energetic materials. Local failure and formation of temperature spikes can result from several factors, such as strain localization due to heterogeneity in a microstructure, material property mismatch between constituents, and the existence of defects such as voids, cracks and inclusions. The ability to identify potential locations of hotspots can be critical, as the local thermo-mechanical response of materials can be subsequently modified by changing constituent and interfacial properties.

Computational and experimental approaches have been widely used to study mechanisms responsible for heat generation in heterogeneous materials. For example, for energetic materials, computational studies have enhanced understanding of heating mechanisms. However, these studies can be limited in terms of the resolution of fine-scale physics and can require experimental data for calibration and validation.

Inelasticity, void collapse, inter-particle contact, and internal fracture and friction can be dominant heating mechanisms in energetic materials and other heterogeneous materials. However, a lack of full understanding and detailed quantification of these underlying heating mechanisms due to the lack of ability to directly measure, in a time- and space-resolved manner, the thermal and mechanical fields at the microstructural level for dynamic conditions can present challenges.

Traditional methods of measuring temperature can include thermocouples, spot pyrometers, heat sensitive films, and infrared temperature detectors along lines or over small areas. However, these methods can be insufficient for homogenous and heterogenous materials, especially for heterogenous, in terms of spatial resolution and time evolution. For heterogenous materials, it is desirable to account for the different emissivities of multiple constituents to determine correct temperatures. In order to account for the different constituents in a heterogenous material, it is also desirable to obtain simultaneously visible light and infrared images of a sample, including an evolving microstructure, as deformation occurs. However, conventional systems and methods are incapable of achieving these desires. Because of these challenges, the study of thermo-mechanical responses of heterogenous materials has been limited to either mechanical deformation or thermal responses.

Accordingly, a need exists for systems and methods for simultaneously recording of a temperature field and a deformation field over the same area of a heterogenous material with high spatial resolutions and temporal resolutions, with little or no image distortion and at normal incidence angles.

SUMMARY

The present disclosure relates to systems and methods for measuring a temperature field and a deformation field.

The disclosed technology can include a system for measuring a temperature field and a deformation field of at least a portion of a sample including a visible light camera at a first location with respect to the sample, an infrared camera at a second location with respect to the sample and a beam splitter. The visible light camera can be configured to take a visible light image of at least a portion of the sample at a first time. The infrared camera can be configured to take an infrared image of at least a portion of the same at the first time. The beam splitter can be configured to receive a beam of light traveling in a direction normal to the at least a portion of the sample. The beam of light can include infrared light and visible light. The beam splitter can be configured to direct the infrared light to the infrared camera and the visible light to the visible light camera.

In any of the embodiments disclosed herein, the beam splitter can be configured to allow the infrared light to continue traveling in the direction normal to at least a portion of the sample to the infrared camera.

In any of the embodiments disclosed herein, the beam splitter can be configured to reflect the visible light at an angle with respect to the direction normal to at least a portion of the sample to the visible light camera.

In any of the embodiments disclosed herein, the angle with respect to the direction normal to at least a portion of the sample can be 90 degrees.

In any of the embodiments disclosed herein, the beam splitter can be a dichroic beam splitter positioned approximately at a forty-five degree angle with respect to the direction normal to at least a portion of the sample.

In any of the embodiments disclosed herein, the beam splitter can be positioned 10 millimeters or less from at least a portion of the sample.

In any of the embodiments disclosed herein, the system can further include one or more distortion corrective lenses configured to receive the infrared light from the beam splitter and correct image distortions induced at least in part by non-normal incidence of the infrared light at the beam splitter.

In any of the embodiments disclosed herein, the system can further include a microscope lens configured to receive the visible light from the beam splitter.

In any of the embodiments disclosed herein, the system can further include a housing at least partially surrounding the sample.

In any of the embodiments disclosed herein, the housing can comprise a transparent material with at least a transmission level of at least 90%.

In any of the embodiments disclosed herein, the housing can comprise a sapphire glass window.

In any of the embodiments disclosed herein, the system can further include a light source positioned to project light onto at least a portion of the sample.

In any of the embodiments disclosed herein, the light source can include one or more LEDs and one or more optical fibers. Each of the optical fibers can have a first end proximate a corresponding LED and a second end proximate at least a portion of the sample.

In any of the embodiments disclosed herein, the visible light camera can have an adjustable spatial resolution of 1 micron.

In any of the embodiments disclosed herein, the visible light camera can have an adjustable temporal resolution of approximately 25,000 frames per second to approximately one million frames per second.

In any of the embodiments disclosed herein, the infrared camera can have an adjustable spatial resolution of 1 micron.

In any of the embodiments disclosed herein, the infrared camera can have an adjustable temporal resolution of approximately 2,000 frames per second to approximately 100,000 frames per second.

In any of the embodiments disclosed herein, the visible light camera can have a first field of view and the infrared camera can have a second field of view.

In any of the embodiments disclosed herein, the second field of view can be larger than the first field of view.

In any of the embodiments disclosed herein, the second field of view can be smaller than the first field of view.

In any of the embodiments disclosed herein, the second field of view can be within the first field of view.

In any of the embodiments disclosed herein, the sample can be homogenous.

In any of the embodiments disclosed herein, the sample can be heterogenous.

In any of the embodiments disclosed herein, the sample can include a metal, polymer, composite, ceramic, shape memory alloy, energetic material, biological tissue, or combination thereof.

In any of the embodiments disclosed herein, the system further comprising a controller configured to simultaneously activate the visible light camera and the infrared camera.

In any of the embodiments disclosed herein, the system can be integrated with a split-Hopkinson pressure bar assembly configured to deform the sample.

In any of the embodiments disclosed herein, the system can further include a processor configured to analyze the visible light and infrared images to determine a location of a hotspot on the sample.

The disclosed technology also includes methods for measuring a deformation field and a temperature field of a sample. The method can include simultaneously recording visible light images with a visible light camera and infrared images with an infrared camera of a target area of at least a portion of the sample over a predetermined time interval. The visible light camera can be located a first position with respect to the sample, and the infrared camera can be located at a second position with respect to the sample.

In any of the embodiments disclosed herein, the method can further include illuminating at least a portion of the sample with a light source.

In any of the embodiments disclosed herein, the light source can include one or more LEDs and one or more optical fibers. Each optical fiber can include a first end proximate a corresponding LED and a second end proximate at least a portion of the sample.

In any of the embodiments disclosed herein, the method can further include receiving a beam of light from at least a portion of the sample. The beam of light can travel in a direction normal to at least a portion of the sample. The beam of light can include infrared light and visible light. The method can further include transmitting the visible light to the visible light camera and transmitting the infrared light to the infrared camera.

In any of the embodiments disclosed herein, transmitting the infrared light to the infrared camera can include allowing the infrared light to continue traveling in the direction normal to at least a portion of the sample to the infrared camera.

In any of the embodiments disclosed herein, transmitting the visible light to the visible light camera can include reflecting the visible light at an angle with respect to the direction normal to at least a portion of the sample to the visible light camera.

In any of the embodiments disclosed herein, the angle with respect to the direction normal to at least a portion of the sample is 90 degrees.

In any of the embodiments disclosed herein, transmitting the infrared light to the infrared camera can include correcting image distortions induced at least in part by non-normal incidence of the infrared light at a beam splitter.

In any of the embodiments disclosed herein, the method can further include determining a temperature field and a deformation field of at least a portion of the sample and analyzing the temperature field and the deformation field in conjunction to correlate a location of a hotspot with microstructure features of at least a portion of the sample.

In any of the embodiments disclosed herein, the determining the deformation field can include implementing a digital image correlation technique on the visible light images.

In any of the embodiments disclosed herein, the digital image correlation technique can include applying a speckle pattern to an area surrounding the target area of at least a portion of the sample.

In any of the embodiments disclosed herein, determining the temperature field can include implementing a pixel-level calibration technique on the infrared images.

In any of the embodiments disclosed herein above, the method can further include synchronizing the visible light camera and the infrared camera.

In any of the embodiments disclosed herein, synchronizing the visible light camera and the infrared camera can include simultaneously transmitting activating signals to the visible light camera and the infrared camera, positioning a calibration target, taking a visible light image of the calibration target using the visible light camera, taking an infrared image of the calibration target using the infrared camera, measuring a spatial resolution of the visible light image, measuring a spatial resolution of the infrared image, defining a reference for the visible light and infrared images, and spatially synchronizing the visible light and infrared images using the reference point and spatial resolution of the visible light and infrared images.

In any of the embodiments disclosed herein, defining the reference point for the visible light and infrared images can include positioning the visible light camera and the infrared camera such that a center pixel of a field of view of the visible light camera is co-located with a center pixel of a field of view of the infrared camera.

In any of the embodiments disclosed herein, the method can further include deforming the sample.

In any of the embodiments disclosed herein, deforming the sample can include compressing the sample to cause the sample to fracture.

In any of the embodiments disclosed herein, the method can further include calibrating the infrared camera, the visible light camera, and an infrared corrective lens assembly using one or more blackbody sources.

In any of the embodiments disclosed herein, the predetermined time interval can be between approximately 1 millisecond and 2 milliseconds.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention

BRIEF DESCRIPTION OF THE FIGURES

Reference will now be made to the accompanying figures, which are not necessarily drawn to scale, and wherein.

DETAILED DESCRIPTION

The disclosed technology relates to an optical imaging system that can include a visible light camera and an infrared camera configured to simultaneously take visible light images and infrared images of the same target area of a sample. A beam splitter can be positioned proximate to the sample in order to direct visible light radiating from the sample to the visible light camera and infrared light radiating from the sample to the infrared camera.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

In the following description, numerous specific details are set forth. But it is to be understood that examples of the disclosed technology can be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Figure 1A:
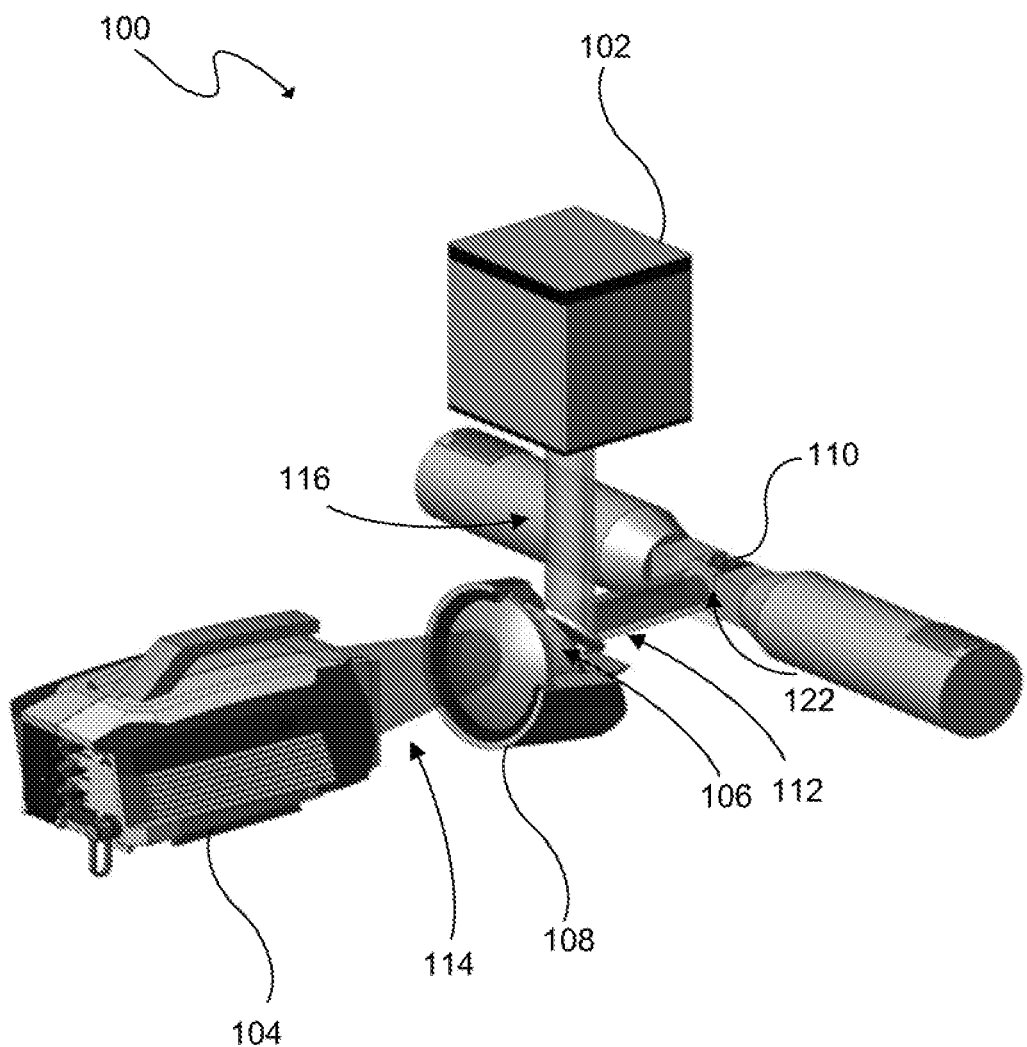
FIG. 1A is a diagram of an optical imaging system, according to some aspects of the present disclosure.

FIG. 1A illustrates a diagram of an example optical imaging system 100. While FIG. 1A depicts a particular arrangement of certain components, the disclosed technology is not so limited but also includes other arrangements that use additional or fewer components. The optical imaging system 100 can include a visible light camera 102, an infrared camera 104, a beam splitter 106, an infrared corrective lens assembly 108, and a sample 110. The optical imaging system 100 can be configured to simultaneously record visible light images and infrared images of a target area of the sample 110.

Visible light, infrared light, and ultraviolet light can be detected by a visible light camera 102. Visible light can enter the visible light camera 102 through one or more lenses of the visible light camera 102. Ultraviolet light can be absorbed by the one or more lenses of the visible light camera 102 before ultraviolet light can enter the visible light camera 102. The visible light camera 102 can include an infrared filter that can block nearly all infrared light from reaching sensors within the visible light camera 102. Visible light can pass through a series of color filters which control what color light reaches an individual light sensor. The sensors can convert visible light into electricity. The sequence of filters coupled with the sensor can translate the visible light traveling from the sample 110 into measurable intensities of red, green, and blue light.

The visible light camera 102 can include a microscope lens. The microscope lens can be positioned to receive visible light from the beam splitter. In one example, the microscope lens can be aligned with the one or more lenses of the visible light camera 102. The microscope lens can facilitate recording visible light images of a microstructure at a high spatial resolution. In one example, the microscope lens can be an Infinity K1 microscope lens.

The visible light camera 102 can record visible light images at a high spatial resolution. The spatial resolution of the recorded visible light images can be less than 25 microns. In one example, the spatial resolution of the recorded visible light images can be approximately 13.4 microns. In another example, the spatial resolution of the recorded visible light images can be one micron. The spatial resolution of the visible light camera 102 can be adjustable (i.e., the special resolution can be varied through a plurality of different resolutions by the user and/or a controller). The spatial resolution can be adjusted based on the size of the sample 110, the material of the sample 110, a user's preferences, or other factors.

The visible light camera 102 can record visible light images at a high temporal resolution. In one example, the visible light camera 102 can record visible light images at a temporal resolution of between approximately 25,000 frames per second to approximately one million frames per second. In one example, the visible light camera 102 can have an adjustable temporal resolution. The temporal resolution can be adjusted based on the size of the sample 110, the material of the sample 110, a user's preferences, or other factors.

In one example, the visible light camera 102 can be a Phantom v2512 high-speed visible light camera.

The visible light camera 102 can be positioned at a first location with respect to the sample 110. The visible light camera 102 can be positioned at a location in which the visible light camera 102 can record a visible light image of at least a portion of the sample 110. The visible light camera 102 can be positioned to receive a visible light beam 116 from the beam splitter 106. In one example, the visible light camera 102 can be positioned vertically above the beam splitter 106, as illustrated in FIG. 1A. In another example, the visible light camera 102 can be positioned below the beam splitter 106.

The infrared camera 104 can include one or more lenses aligned with the infrared camera 104. The one or more lenses can focus infrared light emitted by the sample 110. Sensors within the infrared camera 104 can detect infrared light entering the infrared camera 104 through the one or more lenses. The detected heat energy can be converted into electronic signals, which can be processed to produce an infrared image illustrating the surface temperature of the sample 110. In one example, the infrared camera 104 can be a Telops M2K high-speed thermal imaging camera.

The infrared camera 104 can record infrared images at a high spatial resolution. In one example, the infrared camera 104 can record infrared images at a spatial resolution of 320 by 256 pixels. In another example, the infrared camera 104 can record infrared images at a spatial resolution of 64 by 4 pixels. The infrared camera 104 can record infrared images at a spatial resolution of less than 25 microns. In one example, the infrared camera 104 can record infrared images at a spatial resolution of approximately 11.6 microns. In another example, the infrared camera 104 can record infrared images at a spatial resolution of approximately one micron. The infrared camera 104 can have an adjustable spatial resolution. The spatial resolution can be adjusted based on the size of the sample 110, the material of the sample 110, a user's preferences, or other factors.

The infrared camera 104 can record infrared images at a high temporal resolution. In one example, the infrared camera 104 can record infrared images at a temporal resolution of between approximately 2,000 frames per second to approximately 100,000 frames per second. The infrared camera 104 can have an adjustable temporal resolution. The temporal resolution can be adjusted based on the size of the sample 110, the material of the sample 110, a user's preferences, or other factors.

The infrared camera 104 can be positioned at a second location with respect to the sample 110. The second location is different than the first location of visible light camera 102. The infrared camera 104 can be configured to take an infrared image of at least a portion of the sample 110. The infrared camera 104 can be positioned to receive an infrared beam 114 from the beam splitter 106. In one example, the infrared camera 104 can be positioned at a ninety degree angle with respect to a front surface 122 of the sample 110 such that infrared light radiating in a normal direction with regards to the front surface 122 of the sample 110 can be transmitted directly to the infrared camera 104 (i.e., without requiring the direction of the light to be altered prior to reaching the infrared camera).

Figure 1B:
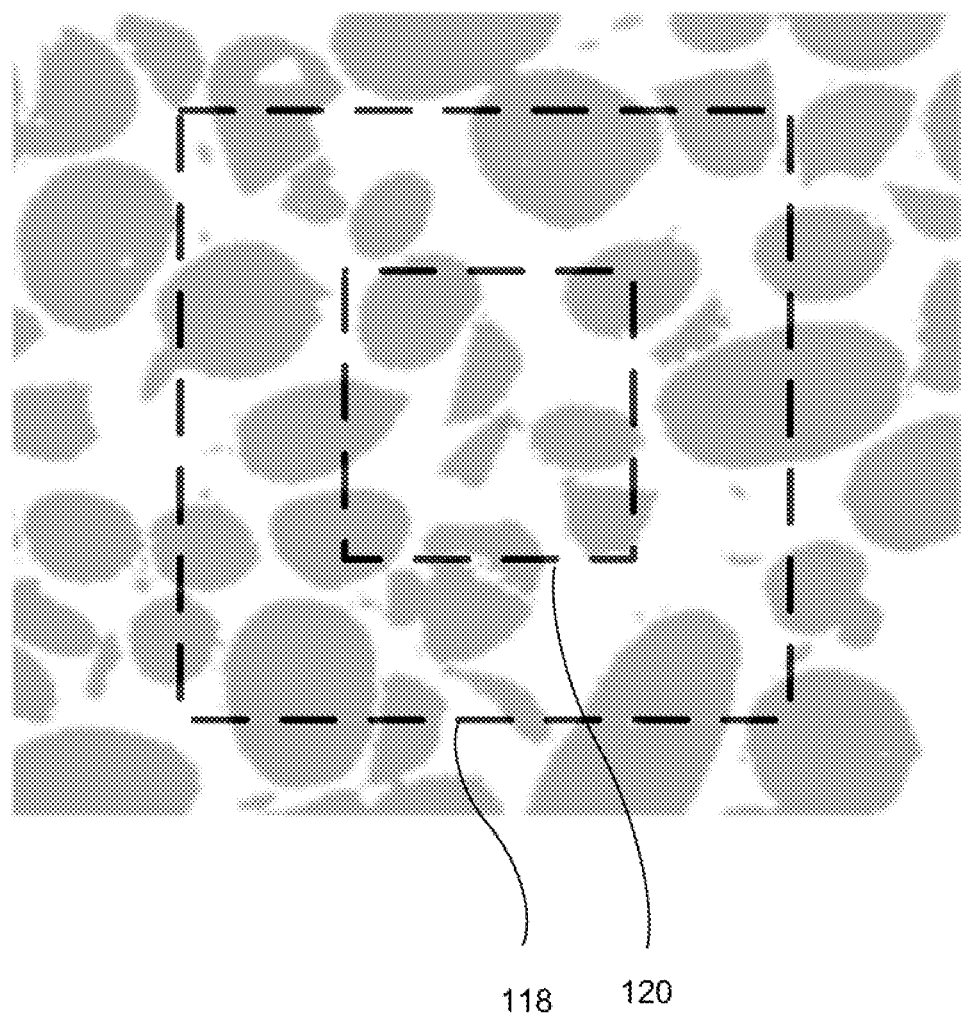
FIG. 1B is an illustration of fields of view for a visible light camera and an infrared camera, according to some aspects of the present disclosure.

The visible light camera 102 can have a first field of view 112 and the infrared camera 104 can have a second field of view 114, as illustrated in FIG. 1B. The first field of view 112 can be larger than the second field of view 114. Alternatively, the first field of view 112 can be smaller than the second field of view 114. In one example, the second field of view 114 can be within the first field of view 112. Alternatively, the first field of view 112 can be within the second field of view 114. By way of example, the visible light camera 102 can have a first field of view 112 having a spatial resolution of 6.9 millimeters by 4.3 millimeters, and the infrared camera 104 can have a second field of view 114 having a spatial resolution of 1.5 millimeters by 1.5 millimeters The optical imaging system 100 can include a beam splitter 106. In one example, the beam splitter 106 is a dichroic beam splitter. The beam splitter 106 can be positioned between the front surface 122 of the sample 110 and the infrared camera 104. The beam splitter 106 can be positioned ten millimeters or less from the sample 110.

The beam splitter 106 can be configured to receive a beam of light 112 traveling in a direction normal to the sample 110. The direction normal to the sample 110 can be perpendicular to the front surface 122 of the sample 110, as illustrated in FIG. 1A. The beam of light 112 can include infrared light and visible light. When the beam of light traveling in the direction normal to the sample 110 contacts the beam splitter 106, the beam splitter 106 can separate the beam of light 112 into two beams of light, a visible light beam 116 and an infrared beam 114. The beam splitter 106 can direct the infrared beam 114 to the infrared camera 104 and the visible light beam 114 to the visible light camera 102. The beam splitter 106 can allow the infrared beam 114 to continue traveling in the direction normal to the sample 110. In this configuration, the infrared beam 114 continues to travel in a direction perpendicular to the front surface 122 of the sample 110. The beam splitter 106 can reflect the visible light beam 116 at an angle with respect to the direction normal to the sample 110. In one example, the angle at which the beam splitter 106 reflects the visible light beam 116 can be ninety degrees.

The beam splitter 106 can be a thin plate. In one example, the beam splitter 106 can be a square plate. Alternatively, the beam splitter 106 can be circular, rectangular, or ellipsoid plate. The beam splitter 106 can have a thickness. For example, the beam splitter 106 can have a thickness within a range of approximately 0.5 millimeters to 3 millimeters. In one example, the beam splitter 106 can be made of glass, metal, or plastic. A first surface of the beam splitter 106 can be coated with a substrate. A second surface of the beam splitter 106 can be coated with an anti-reflection material. In one example, the beam splitter 106 can be positioned at a forty-five degree angle with respect to the direction normal to the sample 110.

The visible light reflection efficiency and the infrared transmission efficiency of the beam splitter 106 can be greater than 85%, such that 85% of the beam of light 112 that can contact the beam splitter 106 can be transmitted.

The optical imaging system 100 can further include an infrared corrective lens assembly 108. The infrared corrective lens assembly 108 can be positioned proximate to the beam splitter 106. The infrared corrective lens assembly 108 can include one or more infrared lenses. The infrared corrective lens assembly 108 can be configured to receive the infrared beam 114 from the beam splitter 106 and correct image distortions induced by the non-normal incidence of the infrared beam 114 at the beam splitter 106.

The sample 110 can be homogenous. In the present instance, a homogenous sample is defined as a sample made entirely of one material. Alternatively, the sample 110 can be heterogenous. In the present instance, a heterogenous sample is defined as a sample made of one or more different materials. The sample 110 can include metals, polymers, composites, ceramics, shape memory alloys, energetic materials, biological material, or any combination thereof.

Figure 2:
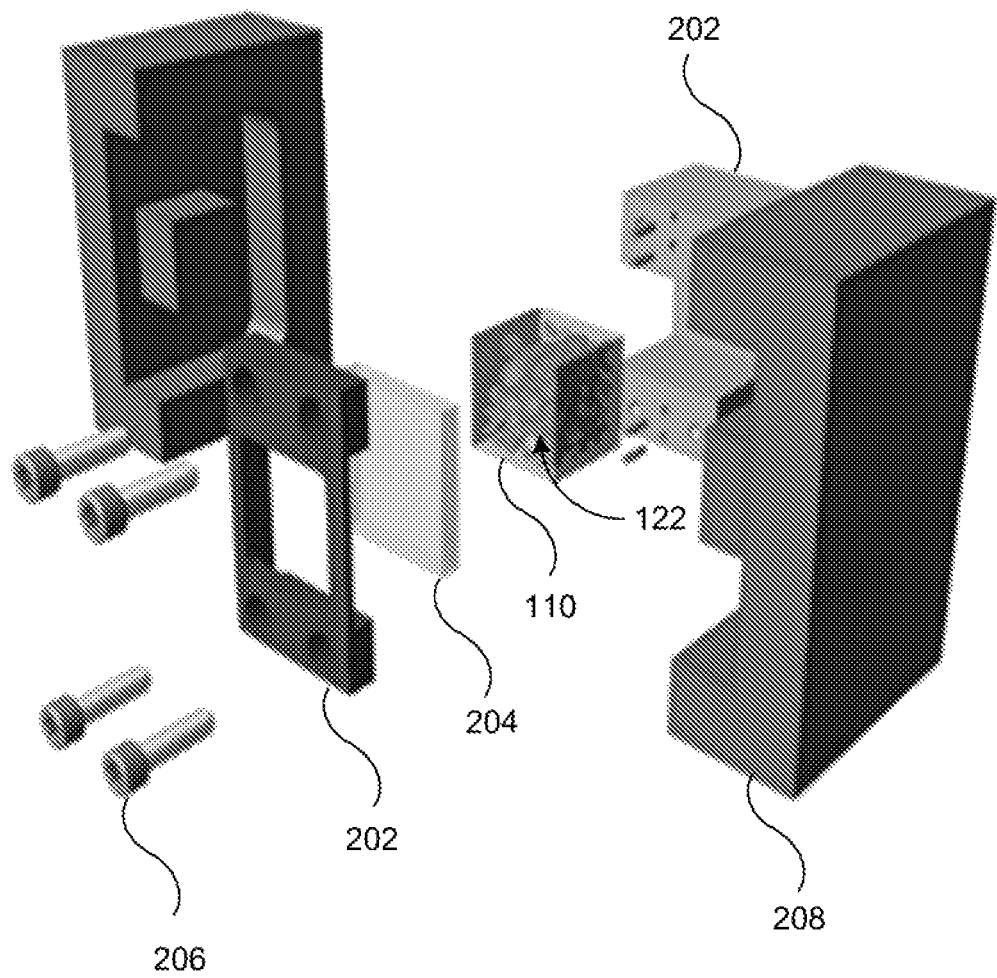
FIG. 2 is an exploded view of a housing surrounding a sample, according to some aspects of the present disclosure.

FIG. 2 illustrates an exploded view of the sample 110 and a housing 202 encasing the sample 110. A housing 202 can at least partially surrounding the sample 110. In one example, the housing 202 can completely surround the sample 110. The housing 202 can include transparent material. The transparent material can have a transmission level of at least 90% such that at least 90% of light can be transmitted through the transparent material. In one example, the housing can include a sapphire glass window 204. Visible light and infrared light can radiate from the sample 110 and pass through the sapphire glass window 204 before contacting the beam splitter 106. The sapphire glass window 204 can be positioned proximate to the sample 110. In one example, the sapphire glass window 204 can be positioned proximate to the front surface 122 of the sample. In one example, the sapphire glass window 204 can be positioned proximate to the sample 110 by one or more screws 206, as illustrated in FIG. 2.

One or more indenters 208 can be positioned proximate to the housing 202. The one or more indenters 208 can compress the sample 110. When the indenters 208 compress the sample 110, the sample 110 can deform.

In one example, optical imaging system 100 can record visible light images and infrared images of a sample 110 that can be sized to fit within a housing 202 having a width and height of approximately five millimeters and a length of approximately 7 millimeters. Alternatively, the optical imaging system 100 can record visible light images and infrared images of a larger sample 110. In one example, the visible light camera 102 and the infrared camera 104 can be positioned in space to record visible light images and infrared images of a larger sample 110.

Figure 3:
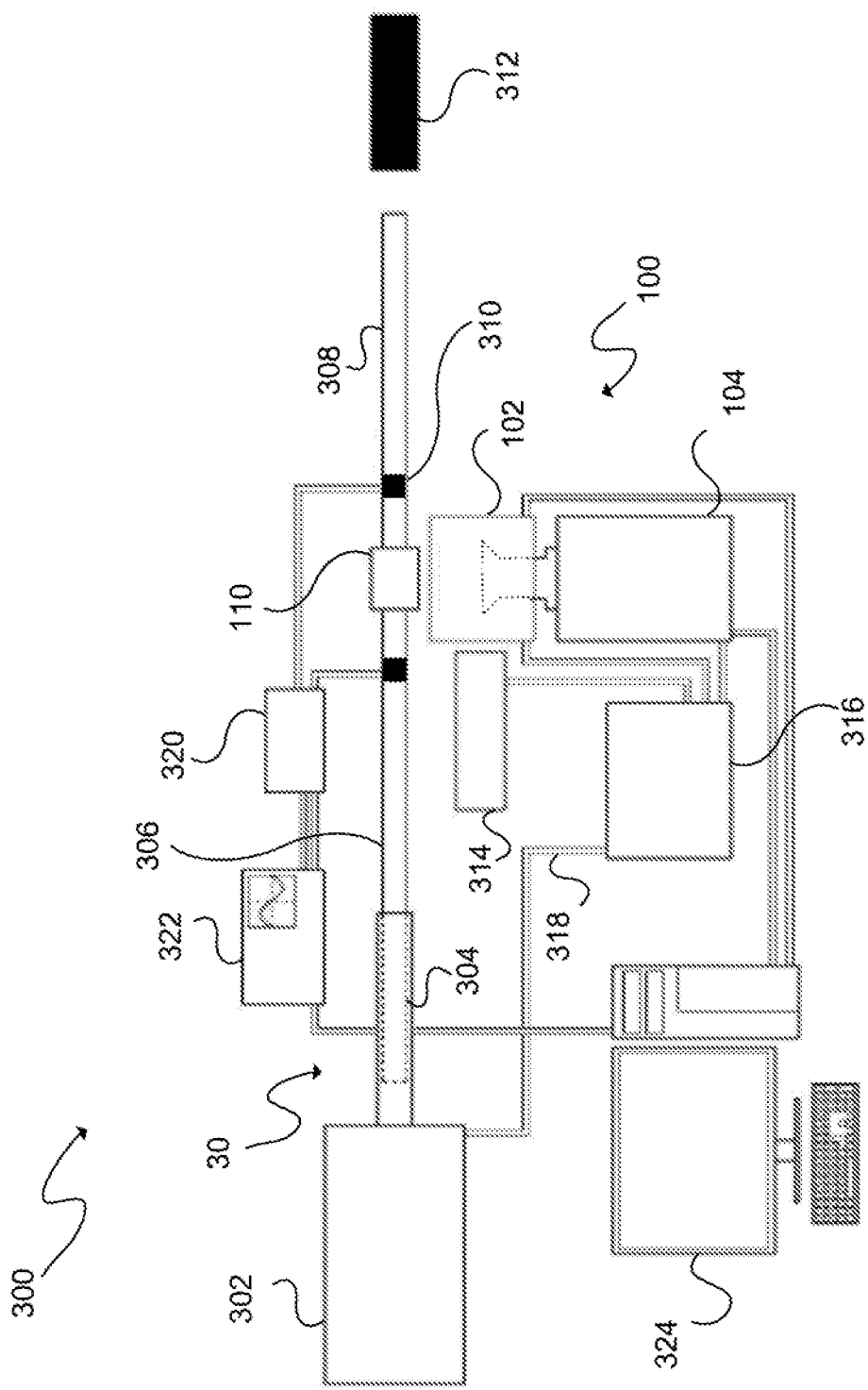
FIG. 3 is a schematic diagram illustrating an optical imaging system integrated with a split-Hopkinson pressure bar, according to some aspects of the present disclosure.

FIG. 3 illustrates a schematic diagram of a deformation system 300 including the optical imaging system 100 integrated with a deformation apparatus 30. While FIG. 3 depicts a particular arrangement of certain components, the disclosed technology is not so limited but also includes other arrangements that use additional or fewer components.

The optical imaging system 100 can be integrated within a deformation apparatus 30 configured to deform the sample 110 and test the resulting dynamic strain response of the sample 110. In one example, the deformation apparatus 30 is a split-Hopkinson pressure bar or Kolsky bar apparatus. The deformation apparatus 30 can include an air gun 302, a striker 304, an incident bar 306, a transmission bar 308, one or more strain gauges 310, and a shock absorber 312. The components of the deformation apparatus 30 can be coaxially aligned.

The gas gun 302 can comprise compressed gas, including compressed air. The gas gun 302 can release the compressed gas causing the striker 304 positioned proximate to the gas gun 302 to contact the incident bar 306. When the striker 304 contacts the incident bar 306, a compression wave can propagate through the incident bar 306. The compression wave can travel to the sample 110 positioned between the incident bar 306 and the transmission bar 308, as illustrated in FIG. 3. When the compression wave reaches the sample 110, the compression wave can split into a first wave and a second wave. The first wave can travel through the sample 110 and to the transmission bar 308. The second wave can reflect back to the incident bar 306. In one example, one or more compression waves can travel to the sample 110, resulting in one or more compression waves each being split into a first wave and a second wave. As the sample 110 is subjected to one or more first waves, the sample 110 can continue to deform. In one example, the sample 110 can fracture, crack, or break into one or more grains 514.

The incident bar 306 can include one or more strain gauges 310. In one example, the one or more strain gauges 310 can be positioned on the external surface of the incident bar 306. The one or more strain gauges 310 can be positioned at the center of the incident bar 306. Alternatively, the one or more strain gauges 310 can be positioned proximate to the incident bar 306. The transmission bar 308 can include one or more strain gauges 310. In one example, the one or more strain gauges 310 can be positioned on the external surface of the transmission bar 308. The one or more strain gauges 310 can be positioned at the center of the transmission bar 308. Alternatively, the one or more strain gauges 310 can be positioned proximate to the transmission bar 308. The one or more strain gauges 310 can detect the one or more compression waves. The strain generated in the incident bar 206 and the transmission bar 308 due to the one or more compression waves propagating through the deformation apparatus 30 can be measured in terms of voltage signal through the one or more strain gauges 310. The one or more strain gauges 310 can be in electrical communication with a signal conditioner 320. In one example, the signal conditioner 320 can amplify the voltage signal from the one or more strain gauges 310. The signal conditioner 320 can be in electrical communication with an oscilloscope 322. The oscilloscope 322 can graphically display the changes in voltage signal caused by the one or more compression waves. The oscilloscope 322 can be in electrical communication with a processor 324. The data from the oscilloscope 322 can be transmitted to the processor 324. The processor 324 can use conventional processing techniques to analyze the data from the oscilloscope 322 to determine strain associated with the one or more compression waves. The deformation apparatus 30 can include a shock absorber 312. The shock absorber 312 can be positioned at one end of the transmission bar 308. The shock absorber 312 can absorb excess energy produced as a result of transmitting one or more compression waves through the deformation apparatus 30.

The incident bar 306 and/or the transmission bar 308 can have a rectangular shape with a uniform cross-section throughout. In one example, the incident bar and/or the transmission bar 308 can have a cylindrical shape. The diameter of the incident bar 306 and the transmission bar 308 can be smaller than the length of the incident bar 306 and the transmission bar 308. In one example, the incident bar 306 and the transmission bar 308 can have the same length. The ends of the incident bar 306 and the transmission bar 308 can be machined flat and orthogonal to a longitudinal axis such that contact can be made between the sample 110 and the incident bar 306 and the transmission bar 306, as well as contact between the striker 304 and the incident bar 306. The incident bar 306 and the transmission bar 308 can be made of identical material. Alternatively, the incident bar 306 and the transmission bar 308 can be made of different material. The incident bar 306 and the transmission bar 308 can be made of aluminum, titanium, magnesium, steel, and other similar materials.

The striker 304 can have the same diameter as the incident bar 306 and/or the transmission bar 308. Alternatively, the striker 304 can have a different diameter as the incident bar 306 and/or the transmission bar 308. The striker 304 can have the same length as the incident bar 306 and/or the transmission bar 308. Alternatively, the striker 304 can have a different length as the incident bar 306 and/or the transmission bar 308. The striker 304 can be made of the same or different material as the incident bar 306 and/or the transmission bar 308.

The deformation system 300 can include the optical imaging system 100. The optical imaging system 100 can include a visible light camera 102 positioned to receive the visible light beam 116 from the beam splitter 106 and an infrared camera 104 can be positioned to receive the infrared beam 114 from the beam splitter 106. The optical imaging system 100 can be configured to record visible light and infrared images of the sample 110 as the sample 110 is subjected to deformation.

The deformation system 300 can further include a light source 314. The light source 314 can be configured to project light onto the sample 110. A sufficiently bright light source is necessary to achieve a high spatial resolution and a high temporal resolution. However, due to a high level of heat generation when a powerful light source is used, temperature measurement of the sample 110 can be affected. Further, because the visible light camera 102 and beam splitter 106 are positioned proximate to the sample 110, only a small space is available for positioning a light source. Therefore, the light source 314 can include one or more LEDs and one or more optical fibers. The one or more optical fibers can include one end proximate to a corresponding LED and a second end proximate to the sample 110. This configuration can transmit sufficient light to the sample 110 despite a confined space. This configuration can also reduce the potential of the temperature of the sample 110 from being affected by the light source 314. In one example, when the light source 314 includes one or more LEDs and one or more optical fibers, the temperature of the sample 110 can increased by only 0.2 K after ten minutes. Because the light source 314 is only activated for a predetermined time interval of one to two milliseconds, the resulting effect on temperature can be undetectable.

The deformation system 300 can further include a controller 316. The controller 316 can send control signals 318 to the gas gun 302, the visible light camera 102, the infrared camera 104, and the light source 314, as illustrated in FIG. 3. When the controller 316 sends a control signal 318 to the gas gun 302, the gas gun 302 can release compressed gas. The released compressed gas can cause the striker 304 to contact the incident bar 306. When the striker contacts the incident bar 306, one or more compression waves can be transmitted through the deformation apparatus 30. The controller 316 can send one or more control signals 318 to the light source 314 to activate the light source 314. In one example, the controller 314 can a control signal 318 to the light source 314 at each time a visible light image or infrared image is recorded.

The controller 316 can simultaneously send control signals 318 to the visible light camera 102 and the infrared camera 104 such that the visible light camera 102 and infrared camera 104 can record visible light images and infrared images, respectively, at the same time of the same target area of the sample 110. This can allow the visible light camera 102 and the infrared camera 104 to be temporally synchronized. In one example, the visible light camera 102 and the infrared camera 104 can be temporally synchronized to simultaneously record visible light images and infrared images, respectively, over a predetermined time interval. The predetermined time interval can be between approximately one millisecond and two milliseconds. The predetermined time interval can be between approximately one second. In one example, the visible light camera 102 and the infrared camera 104 can be temporally synchronized prior to deforming the sample 110.

Figures 4A, 4B:
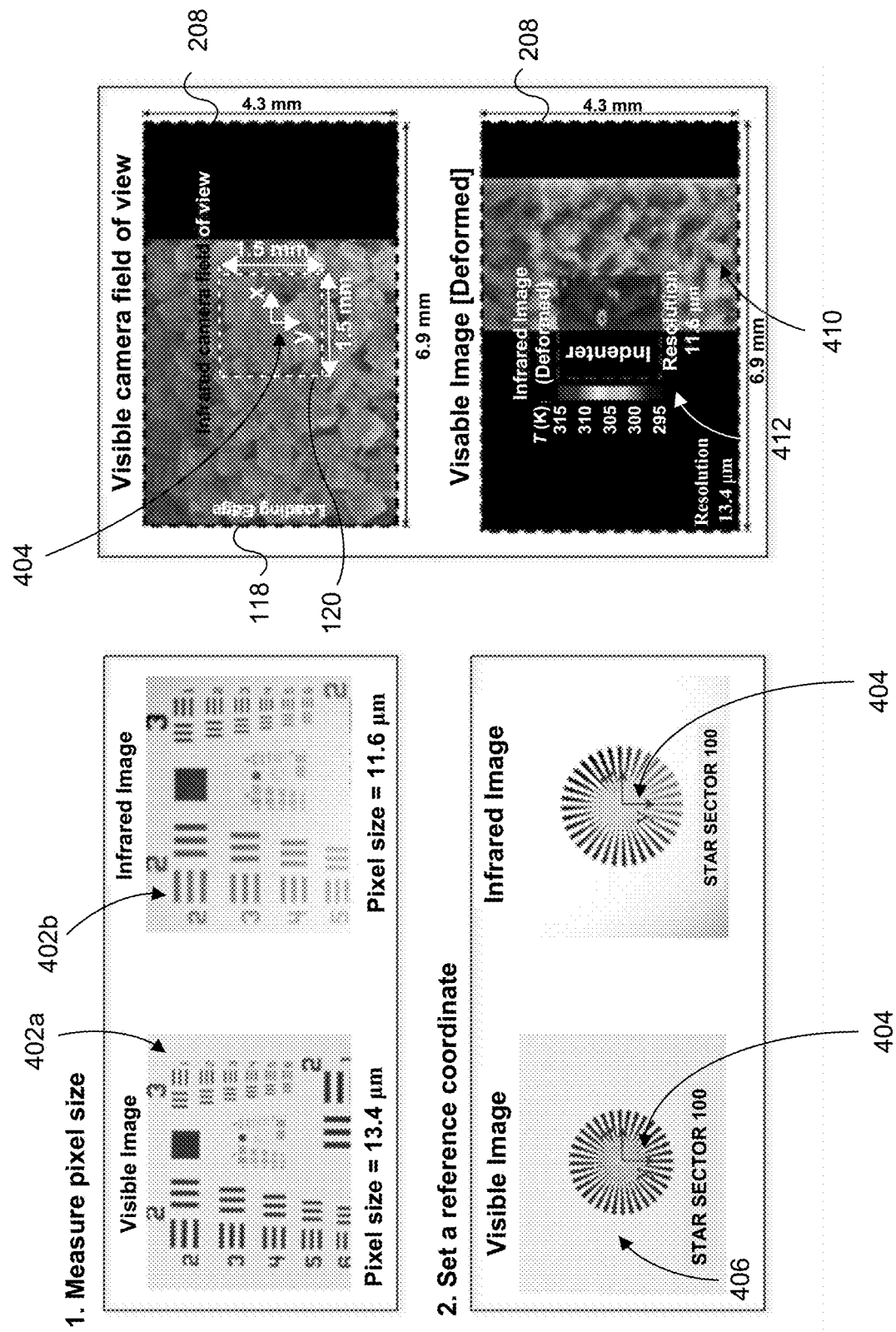
FIG. 4A is a diagram depicting synchronization of a visible light camera and an infrared camera, according to some aspects of the present disclosure.
FIG. 4B is an illustration of synchronized visible light images and infrared images.

FIG. 4A is a diagram depicting spatial synchronization of the visible light camera 102 and the infrared camera 104. In one example, the visible light camera 102 and the infrared camera 104 can be spatially synchronized prior to deforming the sample 110 in order to allow the visible light camera 102 and the infrared camera 104 to simultaneously record visible light images and infrared images, respectively, of the same target area of the sample 110.

To spatially synchronize the visible light camera 102 and the infrared camera 104 to record visible light images and infrared images, respectively, of the same target area of the sample 110, a calibration target 402 can be positioned such that the visible light camera 102 can record a visible light image of the calibration target 402 and the infrared camera 104 can record an infrared image of the calibration target 402. In one example, two calibration targets 402a, 403b are positioned such that the visible light camera 102 can record a visible light image of the first calibration target 402a and the infrared camera 104 can record an infrared image of the second calibration target 402b. The calibration targets 402a, 402b can be visible in a visible light image and an infrared image due to differing colors and emissivity differences between different colors. The calibration target 402a, 402b can include a pattern. In one example, the calibration target 402a, 402b can include a pattern including a plurality of line segments of different lengths and widths, as illustrated in FIG. 4A.

Once the visible light and infrared images of the calibration targets 402a, 402b are recorded, the spatial resolution of the visible light image and the infrared image can be measured. In one example, the spatial resolution of the visible light image is 13.4 microns and the spatial resolution of the infrared image is 11.6 microns. A reference point 404 for the visible light image and the infrared image can then been defined. The reference point 404 can be defined by positioning the visible light camera 102 and the infrared camera 104 such that a center pixel of a field of view 118 of the visible light camera 102 can be co-located with a center pixel of a field of view 120 of the infrared camera 104. In one example, a star sector target 406 can be used to facilitate aligning the center pixel of the field of view 118 of the visible light camera 102 and the center pixel of the field of view 120 of the infrared camera 104. Once the reference point is defined, the visible light and infrared images can be spatially synchronized using the reference point and the spatial resolution of the visible light image and the infrared image.

FIG. 4B illustrates an example of spatially synchronized visible light and infrared images. The visible light camera 102 can have a first field of view 118 and an infrared camera 104 can have a second field of view 120. The reference point 404 can be positioned at the center pixel for the first field of view 118 and the second field of view 120. By spatially synchronizing the visible light camera 102 and the infrared camera 104, a visible light image 410 and an infrared image 412 of the same target area of the sample 110 can be recorded. The visible light image 410 can illustrate deformation of the target area of sample 110 that can occur when the 110 sample is subjected to a physical change, such as compression by indenters 208. The infrared image 412 can illustrate temperature change of the target area of the sample 110 that can occur when the sample 110 is subjected to a physical change, such as compression by indenters 208.

Figure 5:
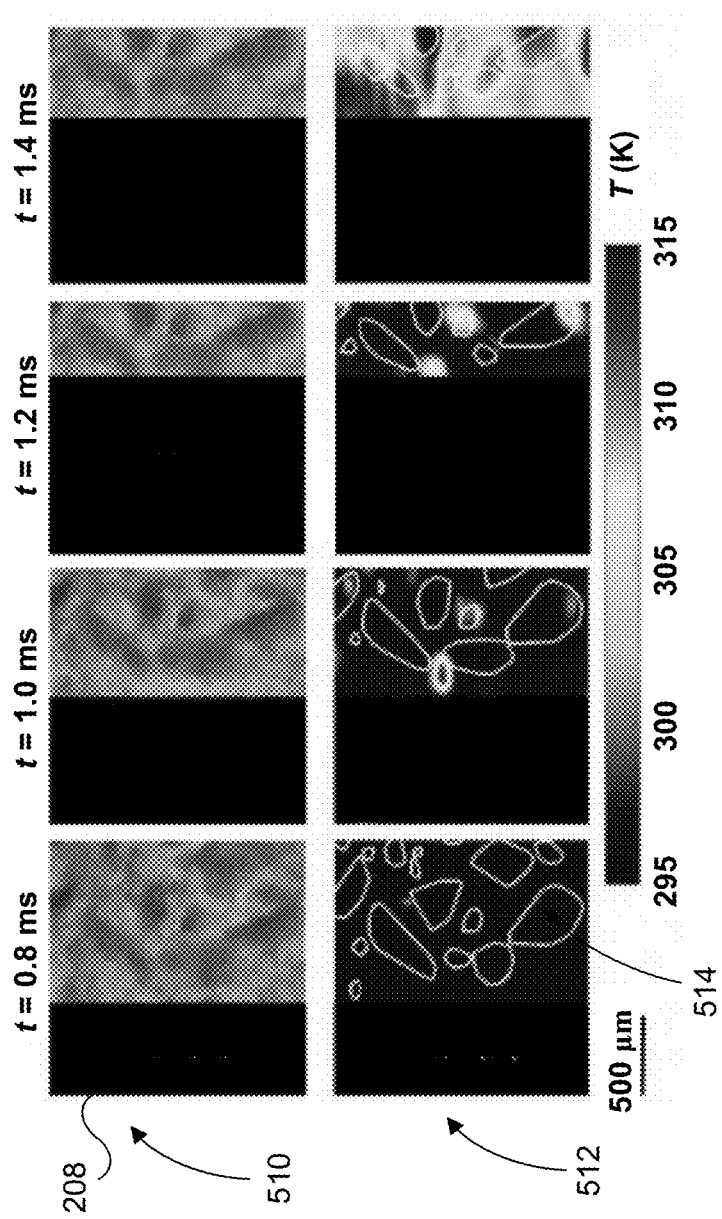
FIG. 5 is an illustration of visible light images and infrared images, according to some aspects of the present disclosure.

FIG. 5 illustrates example visible light images 510 and infrared images 512 during a time interval as the sample 110 is being deformed. The time interval can be any period of time. In one example, the time interval has a length of between approximately one millisecond and two milliseconds. The sample 110 can be deformed or physically altered when the indenters 208 compress the sample 110. The compression can cause the sample 110 to fracture, crush, crack, break, or any other physical alteration. Deformation can produce one or more grains 514 of the sample 110. Alternatively, the sample 110 can remain intact despite the compression.

Deformation can occur in three stages: (1) fragmentation of the sample 110 into grains 514 (2) briquetting and (3) unloading. During the first stage, the sample 110 can be compressed causing the sample 110 to deform and fracture into one or more grains 514. In one example, inter-granular void collapse can occur in the first stage. The first stage can result in no appreciable temperature increase. In one example, the first stage can occur from the start of subjecting the sample 110 to deformation to approximately 0.5 milliseconds. During the second stage, the sample 110 can be further compressed. Although the sample 110 can be further compressed, the sample 110 may not deform into one or more grains 514 as easily as during the first stage. The second stage can result in a temperature increase for at least a portion of the sample 110. In one example, the second stage can occur from approximately 0.5 milliseconds to approximately 1.1 milliseconds. During the third stage, partial unloading can occur, resulting in the overall strain on the sample 110 decreasing. At least a portion of the sample 110 can continue to increase in temperature. In one example, the third stage can occur from approximately 1.1 milliseconds to 1.5 milliseconds.

FIG. 5 illustrates visible light images 510 and infrared images 512 recorded during a 0.8 millisecond to 1.4 millisecond time interval. During the time interval of 0.8 milliseconds to 1.4 millisecond, the sample 110 can be deformed as one or more indenters can 208 compress against the sample 110. The visible light camera 102 and the infrared camera 104 can simultaneously record a plurality of visible light images 510 and infrared images 512, respectively, of the same target area of the sample 110 over the predetermined time interval. For example, FIG. 5 illustrates a visible light image 510 and an infrared image 512 can be recorded at 0.8 millisecond, 1.0 millisecond, 1.2 millisecond, and 1.4 millisecond. Each visible light image 510 and infrared image 514 can record an image of the target area of the sample 110. The visible light images 510 can illustrate the microstructure changes in the target area of the sample 110 as the sample 110 deforms, fractures, cracks, or breaks during the time interval. The infrared images 512 can illustrates changes in temperature of the target area of the sample 110. FIG. 5 illustrates that as the sample 110 is deformed, the temperature can increase for at least a portion of the target area of the sample 110. The visible light images 510 and the infrared images 512 can be produced using a processor and conventional processing techniques.

Prior to determining a temperature field and deformation field for a target area of a sample, the optical imaging system 100, including the infrared camera 104, the beam splitter 106, the infrared corrective lens assembly 108, and the sapphire glass window 204 can be calibrated. One or more blackbody sources can be used to calibrate the optical imaging system 100.

Once the optical imaging system 100, and particularly, the infrared camera 104 are calibrated, a temperature field for a target area of the sample 110 can be measured. The infrared images 514 can illustrate an increase in temperature of a target area of the sample 110. However, an accurate temperature value cannot be determined without knowing the emissivity of the sample 110 at a pixel of interest within the target area of the sample 110. Emissivity is a sample's ability to emit infrared energy. Emissivity can be different for different materials. Therefore, when the sample 110 undergoing deformation is a heterogenous sample, the sample 110 can have a plurality of emissivities. In one example, the emissivity of a first pixel of interest within the target area of the sample 110 can be different than the emissivity of a second pixel of interest within the target area of the sample 110. To determine the emissivity at a pixel of interest within the target area of the sample 110, the material of the sample at the pixel of interest within target area of the sample 110 can be initially determined. The visible light image 510 can provide information needed to determine the material of the pixel of interest. Thus, by correlating the simultaneously recorded visible light image 510 and the infrared image 512 taken of the target area of the sample 110, the material of the pixel of interest can be determined. Once the material of the pixel of interest is determined, the emissivity of the pixel of interest can be calculated. The emissivity of the pixel of interest can be determined due to the infrared camera 104 being previously calibrated. Using the emissivity of the material at the pixel of interest, the accurate temperature of the pixel of interest can be determined. The accurate temperature of the pixel of interest can be determined using the equation:

$$T_s = \frac{T_c}{\sqrt[4]{e}}.$$

In the equation, $T_c$ is the temperature reading of the pixel of interest from the infrared camera 104 without accounting for the emissivity of the pixel of interest, e is the determined emissivity value for the pixel of interest, and $T_s$ is the actual temperature of the sample at the pixel of interest accounting for the emissivity of the pixel of interest. This technique of determining an accurate temperature for each pixel of interest using the emissivity of each pixel of interest and correlation of the visible light images 510 and infrared images 512 can be known as pixel-level calibration.

Figure 6:
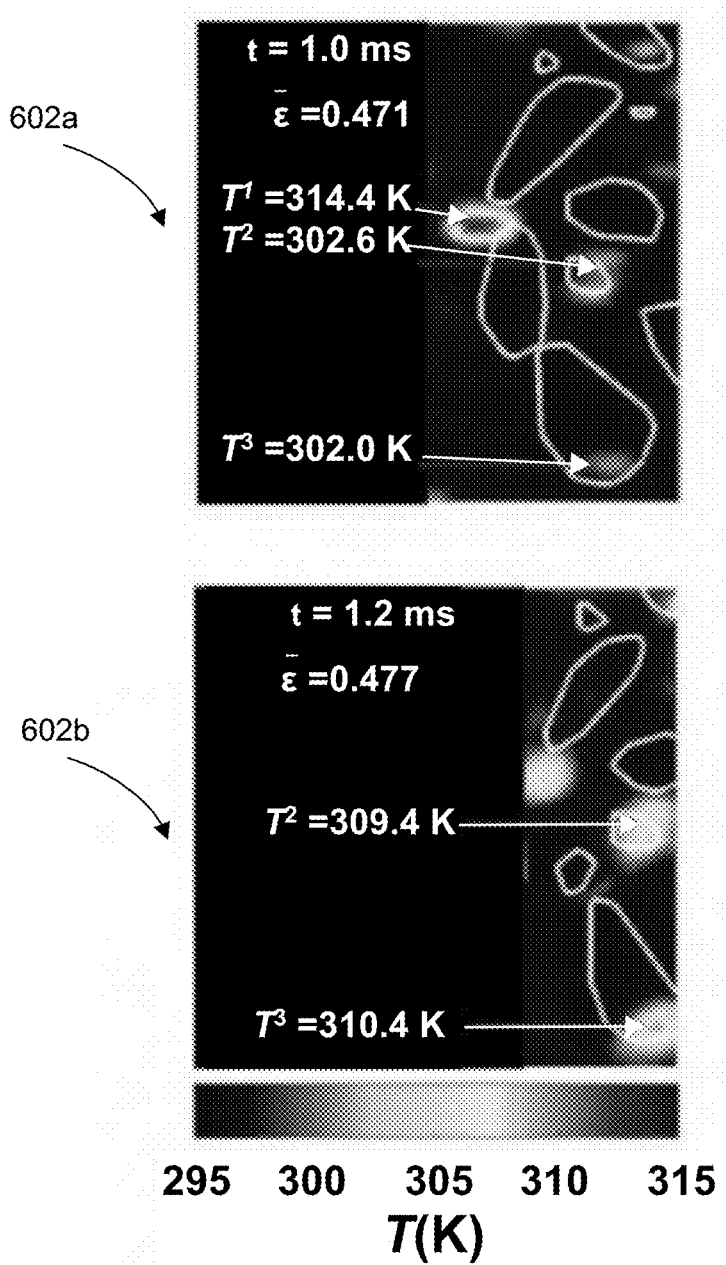
FIG. 6 is an illustration of temperature fields for a target area of a sample, according to some aspects of the present disclosure.

FIG. 6 illustrates example temperature fields 602a, 602b. In FIG. 6 a temperature field 602a, 602b for a target area of the sample 110 at one millisecond and 1.2 millisecond is illustrated. In the temperature field 602a determined for one millisecond, three temperature values were calculated using pixel-level calibration for each pixel of interest indicating a potential increase in temperature. The temperature value of the target area of the sample 110 at the first pixel of interest was calculated to be 314.4 K, the temperature value at the second pixel of interest was calculated to be 302.6 K, and the temperature value at the third pixel of interest was calculated to be 302.0 K. In the temperature field 602b determined for 1.2 millisecond, two temperature values were calculated using pixel-level calibration for two pixels of interest indicating an increase in temperature. The temperature value of the first pixel of interest was calculated to be 309.4 K and the temperature value of the second pixel of interest was calculated to be 310.4 K.

Digital Image Correlation (DIC) can be used to determine a deformation field. DIC is a widely used non-contact technique for measuring deformation. DIC can be implemented using software with enhanced algorithms. In one example, the software implemented can be Ncorr software. When a sample 110 undergoes large deformation, adequate correlation between visible light images recorded at subsequent time intervals can be challenging. To address this challenge, a sequence of visible light images at intermediate stages of deformation can be required, such that the deformation between two visible light images taken at adjacent time intervals can be small enough to allow correlation to be obtained.

Figure 7:
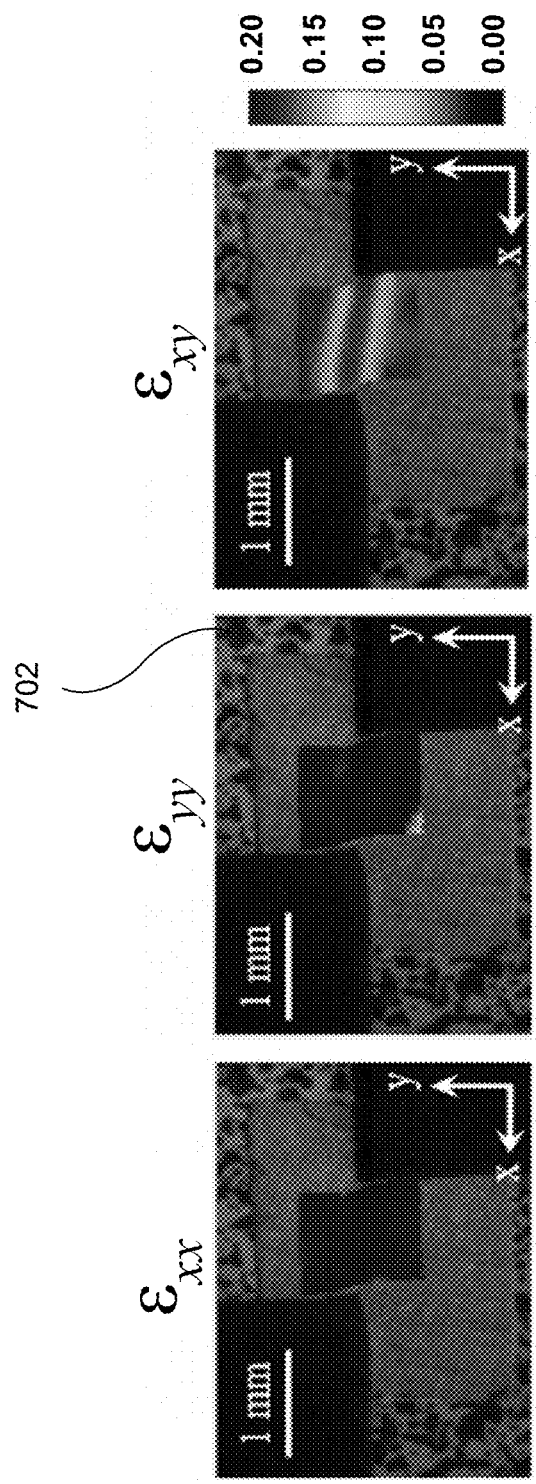
FIG. 7 is an illustration of a digital image correlation technique, according to some aspects of the present disclosure.

DIC can include applying a pattern to a surface of a sample in order to accurately measure deformation of the target area of a sample by correlating changes in the microstructure of the target area of the sample 110 in relation to the pattern. The pattern can be a randomized speckle pattern. Spray paint can be one method of applying the pattern to a surface of the sample. However, application methods that involve directly contacting the surface of the sample 110 with spray paint or any material can affect the temperature of the surface of the sample 110, and thus, affect the infrared images and resulting temperature fields. To address this challenge, a pattern 702 can be applied only to an area surrounding the target area of the sample 110, and deformation can be measured with the outside pattern as the reference, as illustrated in FIG. 7

Because the first stage of deformation can result in large deformation that can cause uncertainties in the correlation between the subsequent images, DIC can be performed during the second stage of deformation.

Figure 8A:
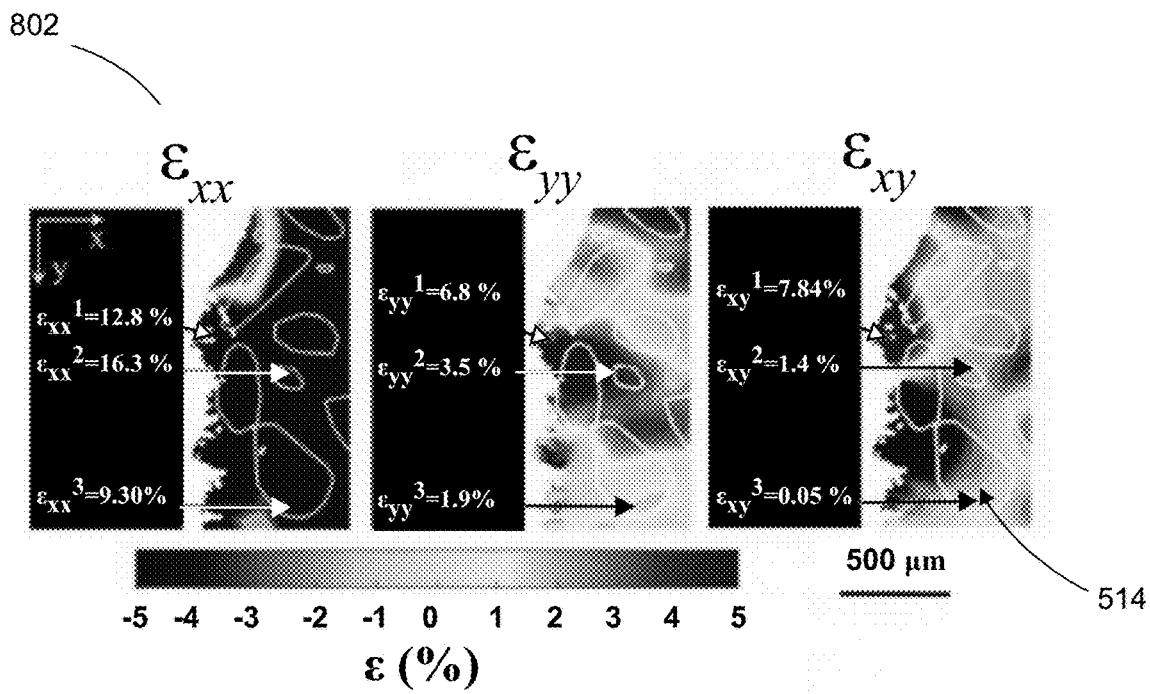
FIG. 8A is an illustration of deformation fields for a target area of a sample at a first time, according to some aspects of the present disclosure.
Figure 8B:
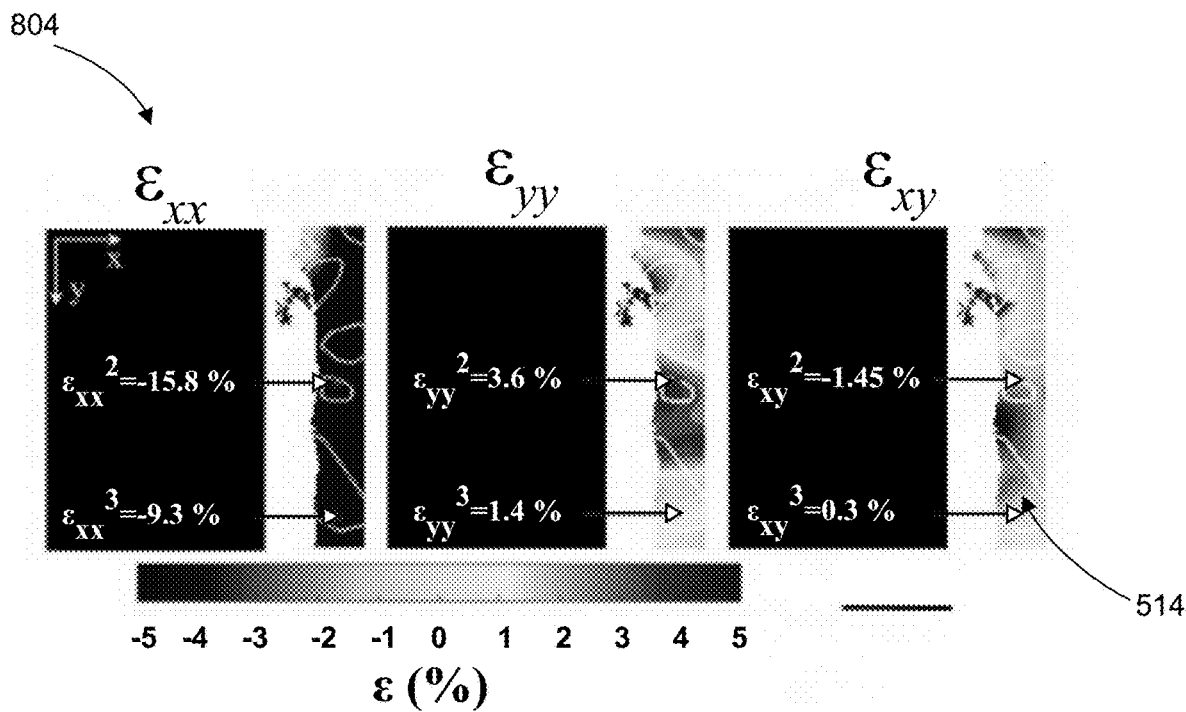
FIG. 8B is an illustration of deformation fields for a portion of a sample at a second time, according to some aspects of the present disclosure.

FIGS. 8A and 8B illustrates example deformation fields 802, 804 for a target area of the sample 110. FIG. 8A illustrates example deformation fields 802 for the target area of the sample 110 at one millisecond. FIG. 8B illustrates example deformation fields 804 for the target area of the sample 110 at 1.2 milliseconds. FIGS. 8A and 8B indicate high strain can occur at vertices of grains 514.

The temperature fields 602a, 602b and deformation fields 802, 804 can be analyzed in conjunction in order to correlate the locations of temperature spikes, including hotspots, within the sample 110 with microstructure features. A processor 324 can facilitate analyzing the temperature fields 602a, 602b and deformation fields 802, 804 to determine the locations of hotspots. As illustrated in FIGS. 6, 8A, and 8B the analysis can indicate the boundaries of unfragmented grains 514 of sample 110 can be the primary location of hotspots. This can be due to the resulting friction that can occur between grains 514 of the sample 110 that became deformed when subjected to compression and grains 514 of the sample that remained unaffected when subjected to compression.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A system comprising:
    a visible light camera at a first location with respect to a sample, the visible light camera configured to take a visible light image of at least a portion of the sample at a first time;

an infrared camera at a second location with respect to the sample, the infrared camera configured to take an infrared image of the at least a portion of the sample at the first time; and a beam splitter;

wherein the beam splitter is configured to receive a beam of light traveling in a direction normal to the at least a portion of the sample;

wherein the beam of light comprises infrared light and visible light;

wherein the beam splitter is further configured to direct the infrared light to the infrared camera and the visible light to the visible light camera;

wherein the beam splitter is further configured to allow the infrared light to continue traveling in the direction normal to the at least a portion of the sample to the infrared camera; and wherein the beam splitter is further configured to reflect the visible light at an angle with respect to the direction normal to the at least a portion of the sample to the visible light camera.

2. The system of claim 1 further comprising one or more calibrating sources configured to calibrate the visible light camera and the infrared camera, wherein at least one of the calibrating sources comprises a blackbody source.

3. The system of claim 1, wherein the visible light camera and the infrared camera are each further configured for spatial synchronization in order to allow the visible light camera and the infrared camera to simultaneously record the visible light image and infrared image, respectively, of the same portion of the sample;

wherein the visible light camera is further configured to take a visible light calibration image of a calibration target on the sample;

wherein the infrared camera is further configured to take an infrared calibration image of the calibration target;

wherein upon measuring a spatial resolution of the visible light calibration image and a spatial resolution of the infrared calibration image, a reference point is defined for the visible light calibration image and the infrared calibration image; and wherein the spatial synchronization uses the reference point and spatial resolutions of the visible light calibration image and the infrared calibration image.

4. The system of claim 1, wherein the beam splitter is a dichroic beam splitter positioned approximately at a forty-five degree angle with respect to the direction normal to the at least a portion of the sample.

5. The system of claim 1, wherein the beam splitter is positioned ten millimeters or less from the at least a portion of the sample.

6. The system of claim 1 further comprising one or more distortion corrective lenses configured to receive the infrared light from the beam splitter and correct image distortions induced at least in part by non-normal incidence of the infrared light at the beam splitter.

7. The system of claim 1 further comprising a microscope lens configured to receive the visible light from the beam splitter.

8. The system of claim 1 further comprising a housing at least partially surrounding the sample.

9. The system of claim 8, wherein the housing comprises a transparent material with a light transmission level of at least 90%.

10. The system of claim 8, wherein the housing comprises a sapphire glass window.

11. The system of claim 1 further comprising a light source positioned to project light onto the at least a portion of the sample.

12. The system of claim 11, wherein the light source includes one or more LEDs and one or more optical fibers, each of the one or more optical fibers comprising a first end proximate a corresponding LED in the one or more LEDs and a second end proximate the at least a portion of the sample.

13. The system of claim 1, wherein the visible light camera has an adjustable spatial resolution of approximately 1 micron and an adjustable temporal resolution of 25,000 frames per second to approximately one million frames per second; and wherein the infrared camera has an adjustable spatial resolution of approximately 1 micron and an adjustable temporal resolution of 2,000 frames per second to approximately 100,000 frames per second.

14. The system of claim 1, wherein the visible light camera has a first field of view and the infrared camera has a second field of view; and wherein the first field of view has a different area than the second field of view.

15. The system of claim 14, wherein the second field of view is within the first field of view.

16. The system of claim 1, wherein the sample is selected from the group consisting of a metal, polymer, composite, ceramic, shape memory alloy, energetic material, biological tissue, and combinations thereof.

17. A method comprising:

simultaneously recording visible light images with a visible light camera and infrared images with an infrared camera of a target area of at least a portion of a sample over a predetermined time interval; and synchronizing the visible light camera and the infrared camera, wherein the synchronizing of the visible light camera and the infrared camera comprises:

simultaneously transmitting activating signals to the visible light camera and the infrared camera;

positioning a calibration target;

taking a visible light image of the calibration target using the visible light camera;

taking an infrared image of the calibration target using the infrared camera;

measuring a spatial resolution of the visible light image;

measuring a spatial resolution of the infrared image;

defining a reference point for the visible light and infrared images; and spatially synchronizing the visible light and infrared images using the reference point and spatial resolution of the visible light and infrared images.

18. The method of claim 17 further comprising calibrating the visible light camera and the infrared camera using one or more blackbody sources.

19. The method of claim 17 further comprising illuminating the at least a portion of the sample with a light source;

wherein the light source includes one or more LEDs and one or more optical fibers, each of the one or more optical fibers comprising a first end proximate a corresponding LED in the one or more LEDs and a second end proximate the at least a portion of the sample.

20. The method of claim 17 further comprising:

receiving a beam of light from the at least a portion of the sample, the beam of light traveling in a direction normal to the at least a portion of the sample, the beam of light comprising infrared light and visible light;

transmitting the visible light to the visible light camera; and transmitting the infrared light to the infrared camera;

wherein the visible light camera is located at a first position with respect to the sample; and wherein the infrared camera is located at a second position with respect to the sample.

21. The method of claim 20, wherein transmitting the infrared light to the infrared camera comprises allowing the infrared light to continue traveling in the direction normal to the at least a portion of the sample to the infrared camera.

22. The method of claim 20, wherein transmitting the visible light to the visible light camera comprises reflecting the visible light at an angle with respect to the direction normal to the at least a portion of the sample to the visible light camera.

23. The method of claim 22, wherein the angle with respect to the direction normal to the at least a portion of the sample is 90 degrees.

24. The method of claim 20, wherein transmitting the infrared light to the infrared camera comprises correcting wave-front distortions induced at least in part by non-normal incidence of the infrared light at a beam splitter.

25. The method of claim 17 further comprising:
determining a temperature field and a deformation field of the at least a portion of the sample; and
analyzing the temperature field and the deformation field in conjunction to correlate a location of a hotspot with microstructure features of the at least a portion of the sample.

26. The method of claim 25, wherein determining the deformation field comprises implementing a digital image correlation technique on the visible light images.

27. The method of claim 26, wherein the digital image correlation technique comprises applying a speckle pattern to an area surrounding the target area of the at least a portion of the sample.

28. The method of claim 25, wherein determining the temperature field comprises implementing a pixel-level calibration technique on the infrared images.

29. The method of claim 17, wherein defining the reference point for the visible light and infrared images comprises positioning the visible light camera and the infrared camera such that a center pixel of a field of view of the visible light camera is co-located with a center pixel of a field of view of the infrared camera.

30. The method of claim 17 further comprising deforming the sample.

31. The method of claim 30, wherein deforming the sample comprises compressing the sample to cause the sample to fracture.

32. The method of claim 17, wherein the predetermined time interval is between approximately 1 microsecond and 2 microseconds.

33. The system of claim 1, wherein the visible light image and the infrared image each have a spatial resolution of less than 25 microns.

34. The method of claim 17, wherein the recorded visible light images and recorded infrared images each have a spatial resolution of less than 25 microns.

* * * * *